US012799317B2

(12) United States Patent
Jeong et al.

(10) Patent No.: US 12,799,317 B2

(45) Date of Patent: *Nov. 17, 2026

(54) GRAFT COPOLYMER, CURABLE RESIN COMPOSITION COMPRISING SAME, AND METHODS OF PREPARING THEM

(71) Applicant: LG Chem, Ltd., Seoul (KR)

(72) Inventors: Min Ah Jeong, Daejeon (KR); Ki Hyun Yoo, Daejeon (KR); Sang Hoon Han, Daejeon (KR); Hye Rim Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 699 days.

This patent is subject to a terminal disclaimer.

(21) Appl. No.: 18/039,763

(22) PCT Filed: Mar. 2, 2022

(86) PCT No.: PCT/KR2022/002952

§ 371 (c)(1),
(2) Date: Jun. 1, 2023

(87) PCT Pub. No.: WO2022/186603

PCT Pub. Date: Sep. 9, 2022

(65) Prior Publication Data

US 2024/0002652 A1 Jan. 4, 2024

(30) Foreign Application Priority Data

Mar. 4, 2021 (KR) ........................ 10-2021-0028992
Mar. 2, 2022 (KR) ........................ 10-2022-0026830

(51) Int. Cl.

| | |
|---|---|
| ***C08L 51/04*** | (2006.01) |
| ***C08F 212/08*** | (2006.01) |
| ***C08F 220/14*** | (2006.01) |
| ***C08F 220/18*** | (2006.01) |
| ***C08F 222/10*** | (2006.01) |
| ***C08L 9/10*** | (2006.01) |
| ***C08L 63/00*** | (2006.01) |

(52) U.S. Cl.

CPC ............ *C08L 51/04* (2013.01); *C08F 212/08* (2013.01); *C08F 220/14* (2013.01); *C08F 220/1804* (2020.02); *C08F 222/102* (2020.02); *C08L 9/10* (2013.01); *C08L 63/00* (2013.01); *C08L 2205/22* (2013.01); *C08L 2207/53* (2013.01)

(58) Field of Classification Search

CPC .. C08L 51/04; C08L 9/10; C08L 63/00; C08F 220/14; C08F 220/18; C08F 212/08; C08F 222/10

USPC .......................................................... 523/201

See application file for complete search history.

(56) References Cited

U.S. PATENT DOCUMENTS

| | | | |
|---|---|---|---|
| 6,037,392 A | 3/2000 | Tang et al. | |
| 2010/0036022 A1 | 2/2010 | Sato et al. | |
| 2012/0157601 A1 | 6/2012 | Navarro et al. | |
| 2013/0017350 A1 | 1/2013 | Fujiwara et al. | |
| 2013/0281629 A1 | 10/2013 | Pirri et al. | |
| 2014/0147660 A1 | 5/2014 | Miyahiro et al. | |
| 2016/0251510 A1 | 9/2016 | Furukawa et al. | |
| 2016/0297960 A1 | 10/2016 | Aguirre-Vargas et al. | |
| 2019/0319236 A1* | 10/2019 | Tanaka | C08F 220/14 |
| 2019/0330463 A1 | 10/2019 | Shim et al. | |
| 2020/0216664 A1 | 7/2020 | Matsuoka et al. | |
| 2021/0171761 A1 | 6/2021 | Bae et al. | |
| 2021/0214544 A1 | 7/2021 | Park et al. | |
| 2021/0284882 A1 | 9/2021 | Ko et al. | |
| 2024/0287303 A1* | 8/2024 | Park | C08F 220/1804 |

FOREIGN PATENT DOCUMENTS

| | | | |
|---|---|---|---|
| CN | 1154980 | A | 7/1997 |
| CN | 105612215 | A | 5/2016 |
| CN | 109983046 | A | 7/2019 |
| JP | S50128744 | A | 10/1975 |
| JP | 2000034321 | A | 2/2000 |
| JP | 2006104328 | A | 4/2006 |
| JP | 2007284469 | A | 11/2007 |
| KR | 19900007766 | | 10/1990 |
| KR | 20060105149 | A | 10/2006 |
| KR | 20100038611 | A | 4/2010 |
| KR | 20130029502 | A | 3/2013 |
| KR | 20150030434 | A | 3/2015 |
| KR | 20150060087 | A | 6/2015 |
| KR | 20160010182 | A | 1/2016 |
| KR | 20160099609 | A | 8/2016 |
| KR | 101847670 | B1 | 5/2018 |

(Continued)

OTHER PUBLICATIONS

International Search Report for Application No. PCT/KR2022/002952 mailed Jun. 9, 2022, pp. 1-3.

Search Report dated Jul. 17, 2025 from the Office Action for Chinese Application No. 202280007851.1 issued Jul. 18, 2025, pp. 1-3.

Extended European Search Report including Written Opinion for Application No. 22763585.1 dated Aug. 6, 24. 6 pgs.

*Primary Examiner* — Deve V Hall

(74) *Attorney, Agent, or Firm* — Lerner David LLP

(57) ABSTRACT

The present invention relates to a graft copolymer, and to a core-shell type graft copolymer comprising: a core comprising a rubbery polymer; and a shell formed by graft polymerizing a graft monomer to the rubbery polymer, wherein the graft copolymer comprises the core in 72 wt % to 83 wt %, the core has an average particle diameter of 250 nm or more, and the shell has a weight average molecular weight of 40,000 g/mol or less, a curable resin composition including the same, and methods of preparing them.

14 Claims, 1 Drawing Sheet

(56) References Cited

FOREIGN PATENT DOCUMENTS

| | | | | | |
|---|---|---|---|---|---|
| KR | 20180069421 | A | | 6/2018 | |
| KR | 20190085491 | | | 7/2019 | |
| KR | 20200055662 | A | | 5/2020 | |
| KR | 20200060928 | A | * | 6/2020 | ............ C08F 279/06 |
| WO | 2011118522 | A1 | | 9/2011 | |
| WO | 2019069976 | A1 | | 4/2019 | |
| WO | 2020022795 | A1 | | 1/2020 | |

* cited by examiner

GRAFT COPOLYMER, CURABLE RESIN COMPOSITION COMPRISING SAME, AND METHODS OF PREPARING THEM

CROSS-REFERENCE TO RELATED APPLICATIONS

The present application is a national phase entry under 35 U.S.C. § 371 of International Application No. PCT/KR2022/002952, filed on Mar. 2, 2022, which claims the benefit of priority based on Korean Patent Application No. 10-2021-0028992, filed on Mar. 4, 2021, and Korean Patent Application No. 10-2022-0026830, filed on Mar. 2, 2022, the entire contents of which are incorporated herein by reference.

TECHNICAL FIELD

The present disclosure relates to a graft copolymer which has excellent particulate dispersibility with respect to a curable resin such as an epoxy resin and may be applied as an impact reinforcing agent with a particulate phase, a curable resin composition comprising the same, and methods of preparing them.

BACKGROUND ART

Curable resins represented by an epoxy resin are used in various fields including electrical and electronic products, automotive parts, building materials, or the like. The curable resin is used together with an additive including an inorganic filler, a release agent, rubber particulates having rubbery properties, or the like, rather than being used alone to supplement physical properties, processability, or the like. Among the curable resins, the epoxy resin often shows brittle characteristics, and improvement of impact resistance or adhesion strength is required.

As a method of improving the impact resistance of the epoxy resin, a method of using the epoxy resin together with a graft copolymer including a rubbery polymer as an impact reinforcing agent has been suggested. The graft copolymer has the particle shape of a core-shell structure including a core including a rubbery polymer and a shell formed on the core through graft polymerization.

Here, in order to apply the graft copolymer as an impact reinforcing agent for an epoxy resin, the graft copolymer is required to disperse in the epoxy resin, and as a method of dispersing the graft copolymer in the epoxy resin, there are a liquid phase dispersion method and a particulate phase dispersion method.

By the liquid phase dispersion method, as shown in FIG. 1, a graft copolymer is dispersed in an epoxy resin by a stepwise solvent substitution method, wherein, in a graft copolymer in a latex state in which the graft copolymer is dispersed in water, the water is substituted with a solvent, and the solvent is substituted with an epoxy resin. Such a liquid phase dispersion method has merits of dispersing the graft copolymer in a homogeneous dispersion matrix of an epoxy resin. However, there are storage problems of storing the graft copolymer in a latex state until being dispersed in order to apply the graft copolymer to the epoxy resin as the impact reinforcing agent, and problems in environmental respects due to the water and the solvent, separately discharged from the substitution process of the graft copolymer and the solvent.

By the particulate phase dispersion method, as shown in FIG. 2, there are merits of low process costs in view of directly dispersing an agglomerated dry powder from a graft copolymer latex, i.e., a particulate phase graft copolymer in an epoxy resin. However, there are problems of substantially very difficult or impossible dispersion of the graft copolymer powder when directly introducing into an epoxy resin, because the viscosity of the graft copolymer powder becomes very high.

Accordingly, in the application of an impact reinforcing agent to a curable resin composition such as an epoxy resin, in order to improve both processing cost and environmental aspects, and in order to apply the particulate phase dispersion method, the improvement of the particulate dispersibility of a graft copolymer powder is required.

PRIOR ART DOCUMENT

Patent Document (Patent Document 1) JP 2006-104328 A

Technical Problem

The present disclosure has been made to solve the above-described problems of the conventional technique, and has an object of providing a graft copolymer which has excellent particulate dispersibility in a curable resin such as an epoxy resin and may be applied as a particulate phase impact reinforcing agent, and a method of preparing the same.

In addition, another object of the present disclosure is to provide a curable resin composition in which the graft copolymer is applied in a particulate phase, and a method of preparing the same.

Technical Solution

In order to solve the above-described tasks, the present disclosure provides a graft copolymer, a curable resin composition, and a method of preparing a curable resin composition.

(1) The present disclosure provides a graft copolymer of a core-shell type, comprising: a core comprising a rubbery polymer; and a shell formed by graft polymerizing a graft monomer to the rubbery polymer, wherein the graft copolymer comprises the core in an amount of 72 wt % to 83 wt % relative to a total weight of the graft copolymer, the core has an average particle diameter of 250 nm or more, and the shell has a weight average molecular weight of 40,000 g/mol or less.

(2) The present disclosure provides the graft copolymer of (1) above, wherein the rubbery polymer comprises one or more monomer units selected from the group consisting of a conjugated diene-based monomer unit and an alkyl acrylate-based monomer unit.

(3) The present disclosure provides the graft copolymer of (1) or (2) above, wherein the rubbery polymer is one or more selected from the group consisting of a homopolymer of a conjugated diene-based monomer, a copolymer of an aromatic vinyl-based monomer-conjugated diene-based monomer, and an acryl-based rubbery polymer.

(4) The present disclosure provides the graft copolymer of any one among (1) to (3) above, wherein the graft monomer is one or more selected from the group consisting of an alkyl (meth)acrylate-based monomer and an aromatic vinyl-based monomer.

(5) The present disclosure provides the graft copolymer of any one among (1) to (4) above, wherein the graft monomer comprises a methyl (meth)acrylate monomer, an alkyl (meth)acrylate-based monomer of 2 to 12 carbon atoms, an aromatic vinyl-based monomer and a crosslinkable monomer.

(6) The present disclosure provides the graft copolymer of (5) above, wherein the crosslinkable monomer is polyethylene glycol diacrylate or allyl methacrylate.

(7) The present disclosure provides the graft copolymer of any one among (1) to (6) above, wherein the graft copolymer comprises the core in an amount of 75 wt % to 80 wt % relative to the total weight of the graft copolymer and the shell in an amount of 20 wt % to 25 wt % relative to the total weight of the graft copolymer.

(8) The present disclosure provides the graft copolymer of any one among (1) to (7) above, wherein the core has an average particle diameter of 250 nm to 350 nm.

(9) The present disclosure provides the graft copolymer of any one among (1) to (8) above, wherein the shell has a weight average molecular weight of 30,000 g/mol to 40,000 g/mol.

(10) The present disclosure provides the graft copolymer of any one among (1) to (9) above, wherein the graft copolymer has an average particle diameter of 250 nm to 500 nm.

(11) The present disclosure provides a curable resin composition comprising a continuous phase and a dispersion phase, wherein the continuous phase comprises a curable resin, and the dispersion phase comprises the graft copolymer according to any one of (1) to (10) above.

(12) The present disclosure provides the curable resin composition of (11) above, wherein the curable resin composition comprises the continuous phase in an amount of 50 wt % to 99 wt % relative to a total weight of the composition and the dispersion phase in an amount of 1 wt % to 50 wt % relative to the total weight of the composition.

(13) The present disclosure provides the curable resin composition of (11) or (12) above, wherein the curable resin is an epoxy resin.

(14) The present disclosure provides a method of preparing a curable resin composition, the method comprising: preparing a graft copolymer latex comprising the graft copolymer according to any one of (1) to (10) above (S10); agglomerating and drying the graft copolymer latex to prepare a graft copolymer powder (S20); and mixing a curable resin and the graft copolymer powder to prepare a curable resin composition (S30), wherein the mixing is performed by dispersing using a stirrer.

(15) The present disclosure provides the method of preparing a curable resin composition of (14) above, wherein a viscosity of the curable resin composition prepared in step (S30) is 2,500 Pa·s or less at 25° C.

Advantageous Effects

The graft copolymer of the present disclosure has excellent particulate dispersibility in a curable resin such as an epoxy resin, and shows dispersing effects in the curable resin composition by a particulate phase dispersion method.

The curable resin composition of the present disclosure could apply a graft copolymer in a particulate phase as an impact reinforcing agent, and shows effects of excellent mechanical properties such as impact resistance due to the graft copolymer dispersed in the curable resin composition.

DETAILED DESCRIPTION

Figure 1:
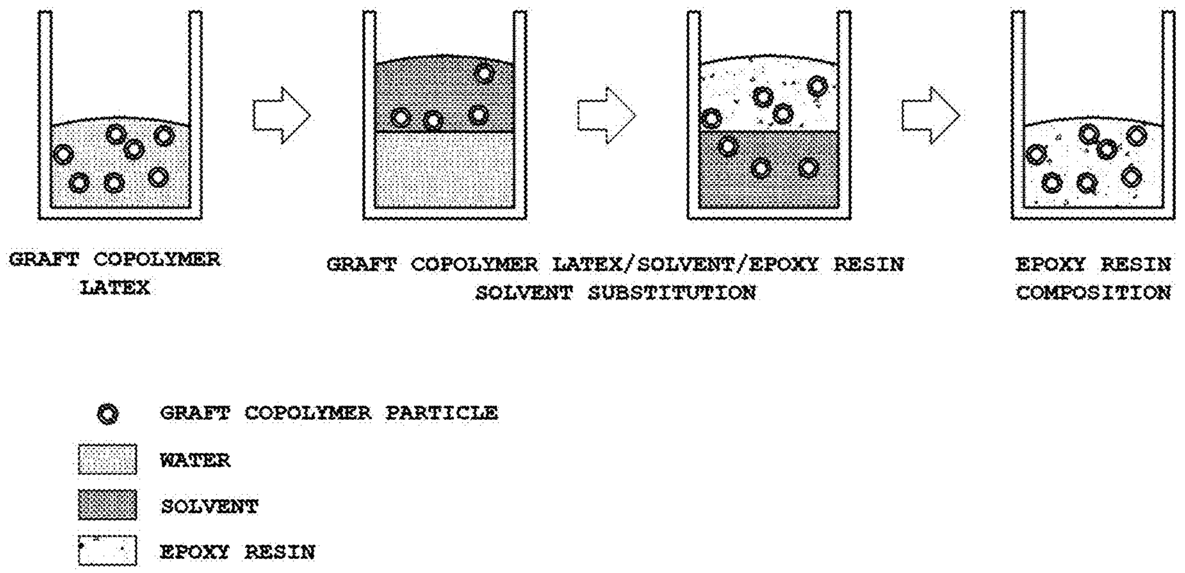
FIG. 1 is a process diagram showing a liquid phase dispersion method for dispersing a graft copolymer in an epoxy resin.
Figure 2:
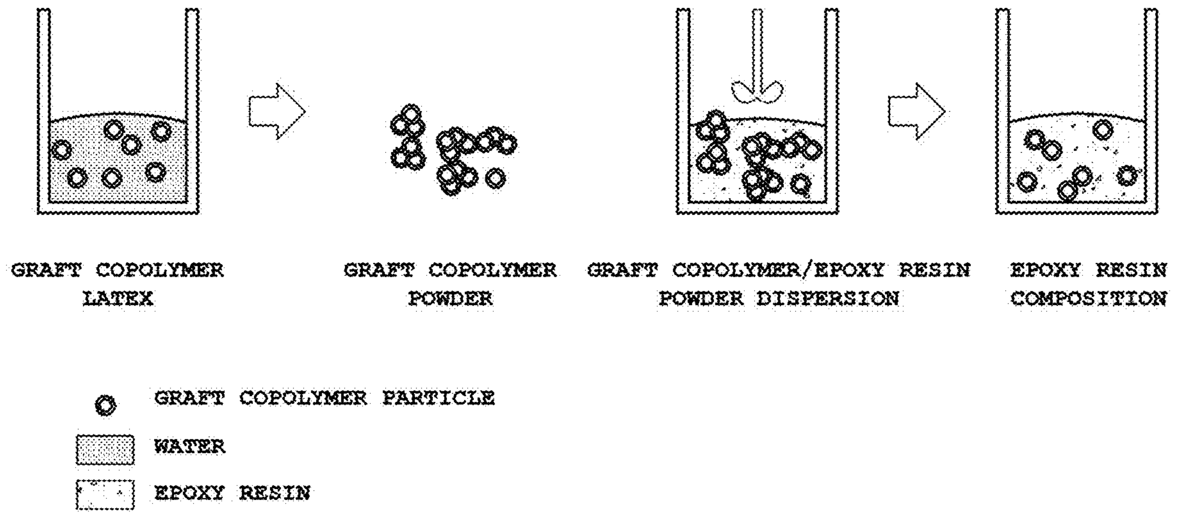
FIG. 2 is a process diagram showing a particulate phase dispersion method for dispersing a graft copolymer in an epoxy resin.

Hereinafter, the present disclosure will be described in more detail to assist the understanding of the present disclosure.

It will be understood that words or terms used in the description and claims of the present disclosure shall not be interpreted as the meaning defined in commonly used dictionaries. It will be understood that the words or terms should be interpreted as having a meaning that is consistent with their meaning in the technical idea of the disclosure, based on the principle that an inventor may properly define the meaning of the words to best explain the invention.

The term "monomer unit" in the present disclosure may represent a component or a structure derived from the monomer or the material itself, in a particular embodiment, may mean a repeating unit formed in the polymer during polymerizing a polymer through the participation of the monomer injected in polymerization reaction.

The term "composition" used in the present disclosure includes a reaction product and a decomposition product formed from the materials of a corresponding composition as well as a mixture of materials including the corresponding composition.

The present disclosure provides a graft copolymer which may be applied as an impact reinforcing agent to a curable resin composition. The graft copolymer according to the present disclosure has improved particulate dispersibility with respect to a curable resin such as an epoxy resin, and is a core-shell type graft copolymer including: a core including a rubbery polymer; and a shell formed by graft polymerizing a graft monomer to the rubbery polymer, wherein the graft copolymer includes the core in an amount of 72 wt % to 83 wt %, the core has an average particle diameter of 250 nm or more, and the shell has a weight average molecular weight of 40,000 g/mol or less, and accordingly, the graft copolymer has dispersing effects in the curable resin composition by a particulate phase dispersion method.

According to an embodiment of the present disclosure, in the core-shell type graft copolymer, the core may mean the core of the graft copolymer or the rubbery polymer component itself forming a core layer, and the shell may be a polymer component or a copolymer component forming a shell or a shell layer as a shell type wrapping the core by graft polymerizing to the rubbery polymer. That is, the core including the rubbery polymer may be the rubbery polymer itself, and the shell may mean a graft layer formed by graft polymerizing a graft monomer to the rubbery polymer.

According to an embodiment of the present disclosure, if the graft copolymer is applied as an impact reinforcing agent, the rubbery polymer is a component for providing impact resistance and may include one or more monomer units selected from the group consisting of a conjugated diene-based monomer unit and an alkyl acrylate-based monomer unit. In a particular embodiment, the rubbery polymer may be a conjugated diene-based rubbery polymer or an acryl-based rubbery polymer. In a more particular embodiment, the conjugated diene-based rubbery polymer may be one or more selected from the group consisting of a homopolymer of a conjugated diene-based monomer and a copolymer of an aromatic vinyl-based monomer-conjugated diene-based monomer, and the acryl-based rubbery polymer may be a homopolymer of an alkyl acrylate-based monomer.

According to an embodiment of the present disclosure, the conjugated diene-based monomer of the rubbery polymer may be one or more selected from the group consisting of 1,3-butadiene, 2,3-dimethyl-1,3-butadiene, piperylene, 3-butyl-1,3-octadiene, isoprene and 2-phenyl-1,3-butadiene, particularly, 1,3-butadiene.

According to an embodiment of the present disclosure, the aromatic vinyl-based monomer of the rubbery polymer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene, particularly, styrene.

According to an embodiment of the present disclosure, the alkyl acrylate-based monomer of the rubbery polymer may be an alkyl acrylate-based monomer of 1 to 12 carbon atoms, particularly, one or more selected from the group consisting of methyl acrylate, ethyl acrylate, propyl acrylate and n-butyl acrylate, more particularly, n-butyl acrylate.

According to an embodiment of the present disclosure, if the graft copolymer is applied as an impact reinforcing agent, the shell is a component for improving compatibility and mechanical properties and may be a graft layer formed by graft polymerizing a graft monomer to the rubbery polymer, as described above. In a particular embodiment, the graft monomer graft polymerized to the rubbery polymer for forming the shell may be one or more selected from the group consisting of an alkyl (meth)acrylate-based monomer and an aromatic vinyl-based monomer, more particularly, an alkyl (meth)acrylate-based monomer and an aromatic vinyl-based monomer.

According to an embodiment of the present disclosure, the alkyl (meth)acrylate-based monomer of the graft monomer may be an alkyl (meth)acrylate-based monomer of 1 to 12 carbon atoms, particularly, one or more selected from the group consisting of methyl methacrylate, ethyl methacrylate, propyl methacrylate, n-butyl methacrylate, methyl acrylate, ethyl acrylate, propyl acrylate and n-butyl acrylate.

According to an embodiment of the present disclosure, the alkyl (meth)acrylate-based monomer of the graft monomer may be two or more monomers selected from the group consisting of an alkyl (meth)acrylate-based monomer of 1 to 12 carbon atoms, particularly, two or more selected from the group consisting of methyl methacrylate, ethyl methacrylate, propyl methacrylate, n-butyl methacrylate, methyl acrylate, ethyl acrylate, propyl acrylate and n-butyl acrylate.

According to an embodiment of the present disclosure, the alkyl (meth)acrylate-based monomer of the graft monomer may be a methyl (meth)acrylate monomer or an alkyl (meth)acrylate-based monomer of 2 to 12 carbon atoms, and in this case, the weight average molecular weight of the shell may be reduced even further. Accordingly, the swelling of the shell during dispersing the graft copolymer in the curable resin may be minimized to prevent the increase of a viscosity. In this case, the alkyl (meth)acrylate-based monomer may include 50 wt % to 99 wt %, 60 wt % to 90 wt %, or 70 wt % to 85 wt % of the methyl (meth)acrylate monomer; and 1 wt % to 50 wt %, 10 wt % to 40 wt %, 15 wt % to 30 wt % of the alkyl (meth)acrylate-based monomer of 2 to 12 carbon atoms.

According to an embodiment of the present disclosure, the alkyl (meth)acrylate-based monomer of the graft monomer may be included in an amount of 80 wt % or more, 85 wt % or more, 90 wt % or more, or 95 wt % or more, and 100 wt % or less, 99 wt % or less, 98 wt % or less, 97 wt % or less, or 96 wt % or less, based on the total amount of the graft monomer.

According to an embodiment of the present disclosure, the aromatic vinyl-based monomer of the graft monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene, particularly, styrene.

According to an embodiment of the present disclosure, the aromatic vinyl-based monomer of the graft monomer may be included in an amount of 0.1 wt % or more, 0.5 wt % or more, 1 wt % or more, 3 wt % or more, or 5 wt % or more, and 20 wt % or less, 15 wt % or less, 10 wt % or less, or 5 wt % or less, based on the total amount of the graft monomer.

According to an embodiment of the present disclosure, the graft monomer may further include a crosslinkable monomer in addition to the alkyl (meth)acrylate-based monomer and the aromatic vinyl-based monomer. That is, the graft monomer may include a methyl (meth)acrylate monomer, an alkyl (meth)acrylate-based monomer of 2 to 12 carbon atoms, an aromatic vinyl-based monomer and a crosslinkable monomer.

According to an embodiment of the present disclosure, the crosslinkable monomer is for improving shell forming capacity by crosslinking during forming the shell by the graft monomer and at the same time, for further improving compatibility and mechanical properties by the shell, and may be one or more selected from a (meth)acryl-based crosslinkable monomer such as ethylene glycol di(meth)acrylate, polyethylene glycol di(meth)acrylate, 1,6-hexanediol di(meth)acrylate, allyl (meth)acrylate, trimethylolpropane tri(meth)acrylate and pentaerythritol tetra(meth)acrylate; and a vinyl-based crosslinkable monomer such as divinylbenzene, divinylnaphthalene and diallyl phthalate, particularly, polyethylene glycol diacrylate or allyl methacrylate.

According to an embodiment of the present disclosure, if the graft monomer further includes the crosslinkable monomer, the crosslinkable monomer of the graft monomer may be included in an amount of 0.01 wt % or more, 0.05 wt % or more, 0.1 wt % or more, or 1 wt % or more, and in an amount of 10 wt % or less, 5 wt % or less, or 1 wt % or less, based on the total amount of the graft monomer.

In the graft copolymer according to the present disclosure, in order to enable its dispersion in a curable resin composition by a particulate phase dispersion method, it is very important to control the amount of the core in the graft copolymer, the average particle diameter of the core and the weight average molecular weight of the shell.

According to an embodiment of the present disclosure, the graft copolymer may include the core in an amount of 72 wt % to 83 wt %, particularly, 75 wt % to 83 wt %, or 75 wt % to 80 wt %. Accordingly, the graft copolymer may include the shell in an amount of 17 wt % to 28 wt %, 17 wt % to 25 wt %, or 20 wt % to 25 wt %, and within this range, if the graft copolymer is dispersed in the curable resin, the swelling of the shell may be minimized to prevent the increase of a viscosity, while sufficiently securing the compatibility of the curable resin and the graft copolymer. On the contrary, if the graft copolymer includes the core in an amount less than the above-described range, the amount of the shell in the graft copolymer may be inevitably increased by that much, and accordingly, there are problems of arising the swelling of the shell having high affinity with the curable resin, increasing a viscosity and degrading dispersibility. In addition, if the graft copolymer includes the core in an amount greater than the above-described range, the compatibility of the curable resin and the graft copolymer may drop sharply, and the increase of the viscosity due to the swelling of the shell may be prevented. However, there are problems of not achieving dispersion substantially. Meanwhile, the amounts of the core and the shell may be derived from the amount ratio of the rubbery polymer and graft monomer injected during preparing the graft copolymer.

According to an embodiment of the present disclosure, the average particle diameter of the core may be 250 nm or more, and in a particular embodiment, the average particle diameter may be 250 nm to 400 nm, or 250 nm to 350 nm, and within this range, the increase of the viscosity may be prevented during dispersing the graft copolymer in the curable resin. If the average particle diameter of the core is less than 250 nm, the average particle diameter of the graft copolymer may be reduced by that much as long as the average particle diameter of the graft copolymer is not increased by the shell, and if the average particle diameter of the core, and thus the average particle diameter of the graft copolymer, is not sufficiently large, agglomeration among small particles may occur, and dispersibility degradation according to the increase of the viscosity may arise.

According to an embodiment of the present disclosure, the shell may have a weight average molecular weight of 40,000 g/mol or less, and in a particular embodiment, the weight average molecular weight may be 15,000 g/mol or more, 17,000 g/mol or more, 30,000 g/mol or more, 32,000 g/mol or more, and 39,000 g/mol or less, 36,000 g/mol or less, 35,000 g/mol or less, or 33,000 g/mol or less. Within this range, during dispersing the graft copolymer in the curable resin, the compatibility of the curable resin and the graft copolymer may be sufficiently secured, and the swelling of the shell may be minimized to prevent the increase of the viscosity. On the contrary, if the weight average molecular weight of the shell is greater than the above-described range, the shell having high affinity with the curable resin may swell to increase the viscosity, and there are problems of degrading dispersibility. The weight average molecular weight of the shell may be controlled by the control of the injection amounts of an initiator and an activator during graft polymerizing the graft monomer in the presence of the rubbery polymer.

As described above, if the amount of the core in the graft copolymer, the average particle diameter of the core and the weight average molecular weight of the shell are controlled according to the present disclosure, dispersion in the curable resin composition by a particulate phase dispersion method may be possible.

According to an embodiment of the present disclosure, the graft copolymer may have an average particle diameter of 250 nm to 500 nm, 250 nm to 450 nm, or 250 nm to 400 nm, and within this range, the increase of the viscosity during dispersing the graft copolymer in the curable resin may be prevented.

In addition, the present disclosure provides a method of preparing the graft copolymer. The method of preparing a graft copolymer includes: preparing a rubbery polymer latex including a rubbery polymer having an average particle diameter of 250 nm or more (S1); injecting a graft monomer and graft polymerizing in the presence of 72 wt % to 83 wt % of the rubbery polymer latex to prepare a graft copolymer latex including a core-shell type graft copolymer (S2), wherein the weight average molecular weight of the shell of the graft copolymer prepared in step (S2) may be 40,000 g/mol or less.

According to an embodiment of the present disclosure, in the method of preparing a graft copolymer, the type and amount of the monomer for performing each step may be the same as the type and amount of the monomer of the graft copolymer previously described.

According to an embodiment of the present disclosure, step (S1) is a step for preparing a rubbery polymer forming a core or a core layer in the core-shell type graft copolymer, and the average particle diameter of the rubbery polymer particles is characterized in being controlled to 250 nm or more. Step (S2) is a step for graft polymerizing to the rubbery polymer to form a shell or a shell layer as a shell type wrapping the core, and the weight average molecular weight of the shell is characterized in being controlled to 40,000 g/mol or less.

According to an embodiment of the present disclosure, step (S1) and step (S2) may be performed by emulsion polymerization, and may be performed in the presence of an emulsifier and an initiator, together with an electrolyte, a molecular weight modifier, an activator, or the like injected for emulsion polymerization. In this case, in performing step (S1), the average particle diameter of the rubbery polymer particles may be controlled by the injection amount of the emulsifier, and in performing step (S2), the weight average molecular weight of the shell may be controlled by controlling the injection amounts of the initiator and/or the activator, or by continuously injecting the graft monomer.

According to an embodiment of the present disclosure, the emulsifier may be one or more selected from the group consisting of a fatty acid-based emulsifier and a rosin acid-based emulsifier, and in this case, excellent effects of latex stability may be achieved.

According to an embodiment of the present disclosure, the injection amount of the emulsifier in step (S1) may be 0.1 parts by weight to 3.4 parts by weight, 1.0 part by weight to 3.3 parts by weight, 1.5 parts by weight to 3.2 parts by weight, 2.0 parts by weight to 3.2 parts by weight, or 2.1 parts by weight to 3.1 parts by weight, based on 100 parts by weight of the monomer for polymerizing the rubbery polymer, and within this range, the average particle diameter of the rubbery polymer particles may be controlled to 250 nm or more.

According to an embodiment of the present disclosure, the injection amount of the emulsifier of step (S2) may be 0.1 parts by weight to 1.0 part by weight, 0.1 parts by weight to 0.5 parts by weight, or 0.1 parts by weight to 0.3 parts by weight based on total 100 parts by weight of the rubbery polymer and the monomer for polymerizing the graft copolymer, and within this range, effects of excellent latex stability may be achieved.

According to an embodiment of the present disclosure, step (S1) may be performed using a water-soluble initiator which may be used during emulsion polymerization, and the water-soluble initiator may be potassium persulfate, sodium persulfate, ammonium persulfate, or the like. Step (S2) may be performed by radical polymerization using a peroxide-based, redox, or azo-based initiator which may be sued for emulsion polymerization, and the redox initiator may be, for example, one or more selected from the group consisting of t-butyl hydroperoxide, diisopropylbenzene hydroperoxide and cumene hydroperoxide, and in this case, effects of providing stable polymerization environment may be achieved. If the redox initiator is used, this step may be performed by further including ferrous sulfide, sodium ethylenediaminetetraacetate and sodium formaldehyde sulfoxylate as a redox catalyst that is an activator, and the weight average molecular weight of the shell may be controlled to 40,000 g/mol or less by controlling the injection amounts of the redox initiator and the redox catalyst.

According to an embodiment of the present disclosure, step (S2) may be performed by continuously injecting a graft monomer. In performing step (S2), if the graft monomer is injected in batch prior to the initiation of the graft polymerization reaction, problems of increasing the weight average molecular weight of the shell may arise.

According to an embodiment of the present disclosure, the emulsion polymerization of step (S1) and step (S2) may be performed in an aqueous solvent, and the aqueous solvent may be ion exchange water.

According to an embodiment of the present disclosure, the method of preparing a graft copolymer may include agglomerating and drying for obtaining the graft copolymer latex prepared in step (S2) as a particulate phase (S3).

In addition, the present disclosure provides a curable resin composition. The curable resin composition may include the graft copolymer as an impact reinforcing agent, and in a particular embodiment, the graft copolymer may be dispersed in a particulate phase.

According to an embodiment of the present disclosure, the curable resin composition may include a continuous phase and a dispersion phase, the continuous phase may include the curable resin, and the dispersion phase may include the graft copolymer. In a particular embodiment, the curable resin composition may include: the continuous phase in an amount of 50 wt % to 99 wt %, 50 wt % to 80 wt %, or 50 wt % to 70 wt %; and the dispersion phase in an amount of 1 wt % to 50 wt %, 20 wt % to 50 wt %, or 30 wt % to 50 wt %.

According to an embodiment of the present disclosure, the curable resin may be a thermosetting resin or a photocuring resin, particularly, one or more selected from the group consisting of an epoxy resin, a phenol resin, an unsaturated polyester resin, a melamine resin and a urea resin, more particularly, an epoxy resin.

According to an embodiment of the present disclosure, the epoxy resin may include at least two or more epoxy bonds, particularly, one or more selected from the group consisting of a bisphenol A-type epoxy resin, a bisphenol F-type epoxy resin, a bisphenol AD-type epoxy resin, a bisphenol E-type epoxy resin, a naphthalene-type epoxy resin, a biphenyl-type epoxy resin, a dicyclopentadiene-type epoxy resin, a phenol novolac-type epoxy resin, an aliphatic cyclic epoxy resin and a glycidyl amine-type epoxy resin.

According to an embodiment of the present disclosure, the curable resin composition may further include a curing agent in addition to the curable resin and the graft copolymer. The curing agent may be one or more selected from the group consisting of an acid anhydride curing agent, an amine-based curing agent and a phenol-based curing agent.

According to an embodiment of the present disclosure, the acid anhydride curing agent may be one or more selected from the group consisting of phthalic anhydride, methyltetrahydrophthalic anhydride, methylhexahydrophthalic anhydride, hexahydrophthalic anhydride, tetrahydrophthalic anhydride, trialkyl tetrahydrophthalic anhydride, methyl himic anhydride, methylcyclohexene dicarboxylic anhydride, trimellitic anhydride, pyromellitic anhydride, benzophenonetetracarboxylic anhydride, ethylene glycol bistrimellitate, glycerol tristrimellitate, dodecenyl succinic anhydride, polyazelaic anhydride and poly (ethyl octadecane diacid) anhydride.

According to an embodiment of the present disclosure, the amine-based curing agent may be one or more selected from the group consisting of 2,5(2,6)-bis(aminomethyl) bicyclo[2,2,1]heptane, isophoronediamine, ethylenediamine, diethylenetriamine, triethylenetetramine, tetraethylenepentamine, diethyl aminopropylamine, bis(4-amino-3-methyl dicyclohexyl)methane, diaminocyclohexylmethane, bis(aminomethyl) cyclohexane, metaphenylenediamine, diaminophenylmethane, diaminodiphenylsulfone, diaminodiethyl diphenylmethane, diethyl toluenediamine, 3,3'-diaminodiphenylsulfone (3,3'-DDS), 4,4'-diaminodiphenylsulfone (4,4'-DDS), diaminodiphenyl ether (DADPE), bisaniline, benzyl dimethylaniline, 3,3'-dichloro-4,4'-diaminodiphenylmethane (MOCA), 4,4-diaminodiphenylmethane, 2,4'-diaminodiphenylmethane, 3,3'-diaminodiphenylmethane, 3,4'-diaminodiphenylmethane, 2,2'-diaminobiphenyl, 3,3'-diaminobiphenyl, 2,4-diaminophenol, 2,5-diaminophenol, o-phenylenediamine, m-phenylenediamine, p-phenylenediamine, 2,3-tolylene diamine, 2,4-tolylene diamine, 2,5-tolylene diamine, 2,6-tolylene diamine, 3,4-tolylene diamine, methyl thio toluene diamine, diethyl toluenediamine and dicyandiamide.

According to an embodiment of the present disclosure, the phenol-based curing agent may be one or more selected from the group consisting of a phenol novolac resin, a cresol novolac resin, bisphenol A, bisphenol F, bisphenol AD and diallyl derivatives of bisphenols.

According to an embodiment of the present disclosure, the curable resin composition may further include an additive in addition to the curable resin and the graft copolymer. The additive may be a releasing agent such as silicon oil, natural wax, and synthetic wax; a powder such as crystalline silica, molten silica, calcium silicate and alumina; fiber such as glass fiber and carbon fiber; a flame retardant such as antimony trioxide; a halogen trapping agent such as hydrotalcite and rare earth oxides; a colorant such as carbon black and iron oxide red; and a silane coupling agent.

In addition, the present disclosure provides a method of preparing a curable resin composition for preparing the curable resin composition.

According to an embodiment of the present disclosure, the method of preparing a curable resin composition includes: preparing a graft copolymer latex including the graft copolymer (S10); agglomerating and drying the graft copolymer latex prepared in step (S10) to prepare a graft copolymer powder (S20); and mixing a curable resin and the graft copolymer powder prepared in step (S20) to prepare a curable resin composition (S30), wherein step (S30) is performed by dispersing using a stirrer.

According to an embodiment of the present disclosure, step (S10) is a step for preparing the graft copolymer and may be performed by the method of preparing a graft copolymer described above.

According to an embodiment of the present disclosure, step (S20) is a step for obtaining the graft copolymer prepared in step (S10) as a powder and may be performed by agglomerating and drying the graft copolymer latex prepared in step (S10).

According to an embodiment of the present disclosure, the agglomeration of step (S20) may be performed by adding a coagulant to the graft copolymer latex. In addition, the agglomeration of step (S20) may be performed by acid agglomeration such as an aqueous sulfuric acid solution and by salt agglomeration such as sodium chloride and sodium sulfate, and both the acid agglomeration and the salt agglomeration may be performed as necessary. In this case, the acid agglomeration and the salt agglomeration may be performed simultaneously or step by step. If the agglomeration is performed step by step, the acid agglomeration may be performed first, and then, the salt agglomeration may be performed, or the salt agglomeration may be performed first, and then, the acid agglomeration may be performed. In addition, the agglomeration of step (S20) may be performed in the presence of an organic dispersant as necessary.

According to an embodiment of the present disclosure, the drying of step (S20) may be performed by a common drying method, and a step of dewatering the agglomerated graft copolymer latex may be further included prior to the drying as necessary.

According to an embodiment of the present disclosure, step (S30) is a step of mixing the curing resin and the graft copolymer by the above-described particulate phase dispersion method in applying the graft copolymer to the curing resin as an impact reinforcing agent, and may be performed by injecting the graft copolymer powder to the curable resin and mixing. As described above, the graft copolymer according to the present disclosure has excellent particulate dispersibility and may be directly dispersed in the curable resin in a particulate phase. In a particular embodiment, the viscosity of the curable resin composition prepared in step (S30) may be 2,500 Pa·s or less, 2,000 Pa·s or less, 100 Pa·s to 2,000 Pa·s, 500 Pa·s to 1,800 Pa·s, or 1,000 Pa·s to 1,600 Pa·s, at 25° C. Within this range, the viscosity of the graft copolymer powder is low, and dispersibility is excellent.

In addition, the present disclosure provides an adhesive composition including the curable resin composition. The adhesive composition may include the curable resin composition as a toughening agent.

According to an embodiment of the present disclosure, the adhesive composition may include a main agent, a urethane resin, a curing agent, a curing accelerator and a filler, which may be used in an adhesive, in addition to the toughening agent.

Hereinafter, embodiments of the present disclosure will be explained in detail so that a person skilled in the art could easily perform the present disclosure. However, the present disclosure may be accomplished in various other types and is not limited to the embodiments explained herein.

EXAMPLES

Example 1

<Preparation of Rubbery Polymer Latex>

To a polymerization reactor (autoclave) substituted with nitrogen, 75 parts by weight of ion exchange water, 60 parts by weight of 1,3-butadiene, 1.4 parts by weight of potassium rosinate, 0.6 parts by weight of potassium oleate, 0.9 parts by weight of potassium carbonate ($K_2CO_3$), 0.3 parts by weight of t-dodecylmercaptan, and 0.3 parts by weight of potassium persulfate ($K_2S_2O_8$) were added in batch, based on total 100 parts by weight of 1,3-butadiene, and polymerization was performed at a reaction temperature of 70° C. Then, 0.7 parts by weight of potassium oleate was injected in batch, at a point where a polymerization conversion ratio reached 30% to 40%, 20 parts by weight of 1,3-butadiene was injected in batch, and polymerization was continued at a reaction temperature of 70° C. Then, after a polymerization conversion ratio reached 60%, 20 parts by weight of 1,3-butadiene was injected in batch, a reaction temperature was raised to 80° C., polymerization was continuously performed, and the reaction was finished at a point where a polymerization conversion ratio reached 95%. Total time consumed for the polymerization was 23 hours, the gel content of a rubbery polymer latex obtained was 76%, and the average particle diameter of rubbery polymer particles was 300 nm.

In this case, the polymerization conversion ratio was calculated as the ratio of the solid weight of the rubbery polymer thus obtained with respect to the solid weight of monomers injected.

<Preparation of Graft Copolymer Latex>

To a closed polymerization reactor substituted with nitrogen, based on total 100 parts by weight of the rubbery polymer latex (based on the solid content), methyl methacrylate and n-butyl acrylate, 80 parts by weight of the rubbery polymer latex prepared based on the solid content was injected, and 200 parts by weight of ion exchange water, 0.2 parts by weight of potassium oleate, 0.036 parts by weight of ferrous sulfide, 0.2 parts by weight of sodium ethylenediaminetetraacetate, 0.2 parts by weight of sodium formaldehyde sulfoxylate and 0.4 parts by weight of t-butyl hydroperoxide were injected in batch. Then, while continuously injecting 16 parts by weight of methyl methacrylate, 3 parts by weight of n-butyl acrylate and 1 part by weight of styrene for 3 hours, polymerization was performed at a reaction temperature of 60° C. for 4 hours to prepare a graft copolymer latex. The final polymerization conversion ratio was 98.3%, and the average particle diameter of the graft copolymer particles was 318 nm.

The polymerization conversion ratio was calculated as the ratio of the solid weight of the graft copolymer thus obtained with respect to the solid weight of the rubbery polymer and monomers injected.

<Preparation of Graft Copolymer Powder>

The graft copolymer latex thus prepared was diluted in distilled water so as to be 15 wt % based on the solid content, the resultant was added to an agglomeration bath, and the internal temperature of the agglomeration bath was raised to 45° C. After that, an IR1076 antioxidant was injected based on 100 parts by weight of the solid content of the graft copolymer, stirring was performed while adding an aqueous sulfuric acid solution to agglomerate, a graft copolymer and water were separated, and dewatering and drying were performed to prepare a graft copolymer powder.

Example 2

The same method as in Example 1 was performed except for injecting 1.7 parts by weight of the potassium rosinate instead of 1.4 parts by weight, and 0.7 parts by weight of the potassium oleate instead of 0.6 parts by weight, during preparing the rubbery polymer latex in Example 1. In this case, the average particle diameter of the rubbery polymer particles prepared was 255 nm, and the average particle diameter of the graft copolymer particles was 264 nm.

Example 3

The same method as in Example 1 was performed except for injecting 1.0 part by weight of the potassium rosinate instead of 1.4 parts by weight, and 0.4 parts by weight of the potassium oleate instead of 0.6 parts by weight, during preparing the rubbery polymer latex in Example 1. In this case, the average particle diameter of the rubbery polymer particles prepared was 338 nm, and the average particle diameter of the graft copolymer particles was 374 nm.

Example 4

The same method as in Example 1 was performed except for injecting 0.072 parts by weight of the ferrous sulfide instead of 0.036 parts by weight, 0.4 parts by weight of the sodium ethylenediaminetetraacetate instead of 0.2 parts by weight, 0.4 parts by weight of the sodium formaldehyde sulfoxylate instead of 0.2 parts by weight, and 0.8 parts by weight of the t-butyl hydroperoxide instead of 0.4 parts by weight during preparing the graft copolymer latex in Example 1. In this case, the average particle diameter of the graft copolymer particles prepared was 320 nm.

Example 5

The same method as in Example 1 was performed except for injecting 0.024 part by weight of the ferrous sulfide instead of 0.036 parts by weight, 0.14 parts by weight of the sodium ethylenediaminetetraacetate instead of 0.2 parts by weight, 0.14 parts by weight of the sodium formaldehyde sulfoxylate instead of 0.2 parts by weight, and 0.27 parts by weight of the t-butyl hydroperoxide instead of 0.4 parts by weight during preparing the graft copolymer latex in Example 1. In this case, the average particle diameter of the graft copolymer particles prepared was 325 nm.

Comparative Example 1

The same method as in Example 1 was performed except for injecting 85 parts by weight of the rubbery polymer latex instead of 80 parts by weight based on the solid content, 12 parts by weight of the methyl methacrylate instead of 16 parts by weight, 2.5 parts by weight of the n-butyl acrylate instead of 3 parts by weight, and 0.5 parts by weight of the styrene instead of 1 part by weight, during preparing the graft copolymer latex in Example 1. In this case, the average particle diameter of the graft copolymer particles prepared was 305 nm.

Comparative Example 2

The same method as in Example 1 was performed except for injecting 70 parts by weight of the rubbery polymer latex instead of 80 parts by weight based on the solid content, 24 parts by weight of the methyl methacrylate instead of 16 parts by weight, 4 parts by weight of the n-butyl acrylate instead of 3 parts by weight, and 2 parts by weight of the styrene instead of 1 part by weight, during preparing the graft copolymer latex in Example 1. In this case, the average particle diameter of the graft copolymer particles prepared was 330 nm.

Comparative Example 3

The same method as in Example 1 was performed except for injecting 0.018 part by weight of the ferrous sulfide instead of 0.036 parts by weight, 0.1 parts by weight of the sodium ethylenediaminetetraacetate instead of 0.2 parts by weight, 0.1 parts by weight of the sodium formaldehyde sulfoxylate instead of 0.2 parts by weight, and 0.2 parts by weight of the t-butyl hydroperoxide instead of 0.4 parts by weight, during preparing the graft copolymer latex in Example 1. In this case, the average particle diameter of the graft copolymer particles prepared was 321 nm.

Comparative Example 4

The same method as in Example 1 was performed except for performing as follows during preparing the graft copolymer latex in Example 1.

<Preparation of Graft Copolymer Latex>

To a closed polymerization reactor substituted with nitrogen, based on total 100 parts by weight of the rubbery polymer latex (based on the solid content), methyl methacrylate and n-butyl acrylate, 80 parts by weight based on the solid content of the rubbery polymer latex prepared was injected, and 200 parts by weight of ion exchange water, 0.2 parts by weight of potassium oleate, 16 parts by weight of methyl methacrylate, 3 parts by weight of n-butyl acrylate and 1 part by weight of styrene were injected in batch. Then, 0.036 parts by weight of ferrous sulfide, 0.2 parts by weight of sodium ethylenediaminetetraacetate, 0.2 parts by weight of sodium formaldehyde sulfoxylate and 0.4 parts by weight of t-butyl hydroperoxide were injected in batch. Then, polymerization was performed at a reaction temperature of 60° C. for 4 hours to prepare a graft copolymer latex. The final polymerization conversion ratio was 98.9%, and the average particle diameter of the graft copolymer particles was 318 nm.

The polymerization conversion ratio was calculated as the ratio of the solid weight of the graft copolymer thus obtained with respect to the solid weight of the rubbery polymer and monomers injected.

Comparative Example 5

The same method as in Example 1 was performed except for injecting 2.0 parts by weight of the potassium rosinate instead of 1.4 parts by weight, and 0.8 parts by weight of the potassium oleate instead of 0.6 parts by weight, during preparing the rubbery polymer latex in Example 1. In this case, the average particle diameter of the rubbery polymer particles prepared was 200 nm, and the average particle diameter of the graft copolymer particles was 211 nm.

Experimental Example 1

With respect to the rubbery polymers and graft copolymers prepared in Examples 1 to 5 and Comparative Examples 1 to 5, the average particle diameters of cores and graft copolymers, and the weight average molecular weights of shells were measured by methods below and are shown in Tables 1 and 2 together with the content of each component and the injection method of a graft monomer during preparing a graft copolymer.

Average particle diameter (nm) of core and graft copolymer: Each of rubbery polymer latexes and graft copolymer latexes prepared in Examples 1 to 5 and Comparative Examples 1 to 5, was diluted in distilled water in a concentration of 200 ppm, and the average particle diameter was measured using a dynamic light scattering (DSL) method according to ISO 22412 using NICOMP 380.

Weight average molecular weight (g/mol) of shell: The weight average molecular weight of a shell in the core-shell type graft copolymer obtained was measured by gel permeation chromatography (GPC, PL GPC220, Agilent Technologies) under the conditions below.

In this case, a portion of a graft copolymer solution dispersed in tetrahydrofuran was taken, a precipitate was separated by centrifuge, a supernatant was taken and filtered using a 0.45 μm PTFE syringe filter, and the resultant was used as a specimen solution. Sampling was performed at a concentration of 30.0 mg/mL based on the graft copolymer, and 1.5 mg/mL of a linear polymer.

Column: PL MiniMixed B×2
Solvent: tetrahydrofuran (stabilized with BHT)
Flow rate: 1.0 ml/min
Specimen concentration: 1.0 mg/ml
Injection amount: 100 μl
Column temperature: 30° C.
Detector: waters 2414 Refractive Index Detector
Data processing: Empower 3

TABLE 1

| Division | | | Example 1 | Example 2 | Example 3 | Example 4 | Example 5 |
|---|---|---|---|---|---|---|---|
| Core | Rubbery polymer | (parts by weight) | 80 | 80 | 80 | 80 | 80 |
| | Average particle diameter | (nm) | 300 | 255 | 338 | 300 | 300 |
| Shell | Methyl methacrylate | (parts by weight) | 16 | 16 | 16 | 16 | 16 |
| | n-Butyl acrylate | (parts by weight) | 3 | 3 | 3 | 3 | 3 |
| | Styrene | (parts by weight) | 1 | 1 | 1 | 1 | 1 |
| | Graft monomer injection method | | Continuous | Continuous | Continuous | Continuous | Continuous |
| | Weight average molecular weight | (g/mol) | 34,100 | 32,800 | 35,100 | 17,400 | 38,700 |
| Graft copolymer | Average particle diameter | (nm) | 318 | 264 | 374 | 320 | 325 |

TABLE 2

| Division | | | Comparative Example 1 | Comparative Example 2 | Comparative Example 3 | Comparative Example 4 | Comparative Example 5 |
|---|---|---|---|---|---|---|---|
| Core | Rubbery polymer | (parts by weight) | 85 | 70 | 80 | 80 | 80 |
| | Average particle diameter | (nm) | 300 | 300 | 300 | 300 | 200 |
| Shell | Methyl methacrylate | (parts by weight) | 12 | 24 | 16 | 16 | 16 |
| | n-Butyl acrylate | (parts by weight) | 2.5 | 4 | 3 | 3 | 3 |
| | Styrene | (parts by weight) | 0.5 | 2 | 1 | 1 | 1 |
| | Graft monomer injection method | | Continuous | Continuous | Continuous | In batch | Continuous |
| | Weight average molecular weight | (g/mol) | 31,500 | 37,200 | 43,200 | 58,100 | 35,600 |
| Graft copolymer | Average particle diameter | (nm) | 305 | 330 | 321 | 318 | 211 |

As shown in Tables 1 and 2 above, it could be confirmed that the graft copolymers of Examples 1 to 5, prepared according to the present disclosure were prepared to have the core contents in the graft copolymer, the average particle diameters of the core and the weight average molecular weights of the shell in ranges defined in the present disclosure.

Meanwhile, it could be confirmed that Comparative Example 1 had an excessive amount of the core in the graft copolymer, Comparative Example 2 had a small amount of the core in the graft copolymer, Comparative Example 3 had a high weight average molecular weight of the shell, Comparative Example 4 had a very high weight average molecular weight of the shell through the injection of the graft monomer in batch, and Comparative Example 5 had a small average particle diameter of the core.

Experimental Example 2

Epoxy resin compositions were prepared as curable resin compositions in which a graft copolymer was dispersed, by using the graft copolymer powders prepared in Examples 1 to 5 and Comparative Examples 1 to 5.

<Preparation of Epoxy Resin Composition in which Graft Copolymer is Dispersed>

To a revolution-rotation mixer (planetary mixer, KMTECH, KPLM-0.6) set to 70° C., 60 parts by weight of an epoxy resin (Kukdo Chemical Co., YD-128), and 40 parts by weight of the graft copolymer powder prepared in each of Examples 1 to 5 and Comparative Examples 1 to 5 were injected, based on total 100 parts by weight of the epoxy resin and the graft copolymer, and the graft copolymer powder was dispersed in the epoxy resin by stirring at 10 rpm for 1 hour, at 80 rpm for 2 hours, and 60 rpm for 10 hours to prepare an epoxy resin composition in which a graft copolymer was dispersed.

With respect to the epoxy resin composition thus prepared, the dispersion state of the graft copolymer was confirmed by a method below, a viscosity was measured, and the results are shown in Tables 3 and 4 below.

Dispersion state: On a cold rolled (CR) steel having a size of 25 mm×100 mm, an epoxy resin composition was applied to a thickness of 0.2 mm, and the number of particles observed with the naked eye was checked. In this case, if the number of the particles observed with the naked eye is less than 10, the dispersion state represents excellent, if from 10 to less than 50, the dispersion state represents common, and if 50 or more, the dispersion state represents bad.

25° C. viscosity (Pa·s): With respect to the epoxy resin composition prepared, the viscosity of 25° C. was measured using Rheometer (Anton paar Co., MRC 302), and a viscosity value at a shear rate of 2.4 $s^{-1}$, 100 s is shown.

TABLE 3

| | Example | | | | |
|---|---|---|---|---|---|
| Division | 1 | 2 | 3 | 4 | 5 |
| Dispersion state | 2 | 5 | 3 | 0 | 8 |
| 25° C. (Pa · s) viscosity | 1,509 | 1,789 | 1,450 | 1,298 | 1,920 |

TABLE 4

| | Comparative Example | | | | |
|---|---|---|---|---|---|
| Division | 1 | 2 | 3 | 4 | 5 |
| Dispersion state | 50 or more | 3 | 7 | 8 | 5 |
| 25° C. (Pa · s) viscosity | 1,521 | 2,950 | 3,162 | 6,160 | 3,111 |

As shown in Tables 3 and 4, it could be confirmed that the curable resin composition in which the graft copolymer of the present disclosure was applied in a particulate phase as an impact reinforcing agent, had a sufficient dispersion state of the graft copolymer powder as well as a low viscosity at 25° C. and excellent dispersibility.

On the contrary, in Comparative Example 1, it could be confirmed that the amount of the core in the graft copolymer was an excessive amount, and the compatibility of the curable resin and the graft copolymer was rapidly reduced, and though the increase of the viscosity due to the swelling of the shell could be prevented, the dispersion was not actually performed.

In addition, in Comparative Example 2, it could be confirmed that the amount of the shell in the graft copolymer was increased by the insufficient amount of the core in the graft copolymer, and the shell having high affinity with the epoxy resin was swollen, the viscosity was increased, and dispersibility was degraded.

In addition, in Comparative Example 3, it could be confirmed that the weight average molecular weight of the shell was high, the shell having high affinity with the epoxy resin was swollen, the viscosity was increased, and dispersibility was degraded.

In addition, in comparative Example 4, it could be confirmed that the weight average molecular weight of the shell was shown very high due to the injection of the graft monomer in batch, and accordingly, the shell having high affinity with the epoxy resin was swollen, the viscosity was increased, and dispersibility was degraded.

In addition, in the case of Comparative Example 5 having a small average particle diameter of the core, the size of the average particle diameter of the core and accordingly, the size of the average particle diameter of the graft copolymer was insufficient, agglomeration among small particles occurred, and the viscosity was increased to degrade dispersibility.

Experimental Example 3

By using the epoxy resin composition prepared in Experimental Example 2, a structural adhesive composition was prepared by a method below.

<Structural Adhesive Composition>

An epoxy resin (Kukdo Chemical Co., YD-128) as a main agent, an epoxy resin composition (a weight ratio of epoxy resin:graft copolymer powder=60:40) according to each of Examples 1 to 5 and Comparative Examples 1 to 5, prepared in Experimental Example 2, a urethane resin (Adeka Co., QR-9466), a curing agent (Evonik Co., Dicyanex 1400F), a curing accelerator (Evonik Co., Amicure UR7/10), potassium oxide (Youyeong Materials Co., UNI-OX), and fumed silica (Carbot Co., CAB-O-SIL TS-720) were mixed in the amounts recorded in Tables 5 and 6 below, using a paste mixer (KMTECH Co., PDM-300) at 600 rpm revolution and at 500 rpm rotation for 3 minutes, and defoamed at 600 rpm revolution and at 200 rpm rotation for 5 minutes to prepare an adhesive composition. In this case, the curing agent was injected according to the equivalent of the epoxy resin, and the curing accelerator was injected in an equivalent ratio of 1/7 of the curing agent.

With respect to the structural adhesive composition prepared, impact peel strength was measured by a method below and shown in Tables 5 and 6 below.

Impact peel strength (N/mm): Impact peel strength of the structural adhesive composition prepared was measured according to the standard of ISO 11343. The size of a specimen was 90 mm×20 mm×1.6 T (mm), and the size of one side for applying the adhesive composition was 30 mm×20 mm. Contaminants were removed from the one side of the specimen using ethanol, and the structural adhesive composition prepared was applied. The thickness of the adhesive composition was maintained constant using microbeads, the top was covered with another specimen to fix, and curing was performed at 180° C. for 30 minutes. After curing, the resultant was stabilized at 25° C. and −40° C. for 1 hour or more each, and a load was applied in a rate of 2 m/sec using an impact strength tester (Instron Co., 9350) to measure impact peel strength according to a shear strength.

TABLE 5

| Division | | | Example 1 | 2 | 3 | 4 | 5 |
|---|---|---|---|---|---|---|---|
| Structural adhesive composition | Main agent | (parts by weight) | 53.4 | 53.4 | 53.4 | 53.4 | 53.4 |
| | Toughening agent | (parts by weight) | 15.0 | 15.0 | 15.0 | 15.0 | 15.0 |
| | Urethane resin | (parts by weight) | 22.0 | 22.0 | 22.0 | 22.0 | 22.0 |
| | Curing agent | (parts by weight) | 4.9 | 4.9 | 4.9 | 4.9 | 4.9 |
| | Curing accelerator | (parts by weight) | 0.7 | 0.7 | 0.7 | 0.7 | 0.7 |
| | Calcium oxide | (parts by weight) | 3.0 | 3.0 | 3.0 | 3.0 | 3.0 |
| | Fumed silica | (parts by weight) | 1.0 | 1.0 | 1.0 | 1.0 | 1.0 |
| Impact peel strength | 25° C. | (N/m) | 33.4 | 33.7 | 33.0 | 33.0 | 33.3 |
| | −40° C. | (N/m) | 29.1 | 28.3 | 28.5 | 28.7 | 29.0 |

TABLE 6

| Division | | | Comparative Example 1 | 2 | 3 | 4 | 5 |
|---|---|---|---|---|---|---|---|
| Structural adhesive composition | Main agent | (parts by weight) | 53.4 | 53.4 | 53.4 | 53.4 | 53.4 |
| | Toughening agent | (parts by weight) | 15.0 | 15.0 | 15.0 | 15.0 | 15.0 |
| | Urethane resin | (parts by weight) | 22.0 | 22.0 | 22.0 | 22.0 | 22.0 |
| | Curing agent | (parts by weight) | 4.9 | 4.9 | 4.9 | 4.9 | 4.9 |
| | Curing accelerator | (parts by weight) | 0.7 | 0.7 | 0.7 | 0.7 | 0.7 |
| | Calcium oxide | (parts by weight) | 3.0 | 3.0 | 3.0 | 3.0 | 3.0 |
| | Fumed silica | (parts by weight) | 1.0 | 1.0 | 1.0 | 1.0 | 1.0 |
| Impact peel strength | 25° C. | (N/m) | 29.5 | 30.5 | 32.2 | 29.3 | 33.8 |
| | −40° C. | (N/m) | 24.3 | 24.4 | 28.7 | 24.4 | 25.7 |

As shown in Tables 5 and 6, the curable resin compositions of the present disclosure showed a sufficient dispersion state of the graft copolymer powder, low viscosity at 25° C., and excellent dispersibility, and accordingly, if applied as a toughening agent in the adhesive composition, it could be confirmed that impact peel strengths at room temperature (25° C.) and low temperature (−40° C.) of the structural adhesive compositions were all excellent.

On the contrary, if the curable resin compositions of Comparative Examples 1 to 5 were applied as the toughening agents, it could be confirmed that the impact peel strengths at room temperature and/or low temperature were degraded. This is due to the deterioration of the dispersibility of the graft copolymer of a particulate phase with respect to the curable resin.

From such results, it could be confirmed that the graft copolymer of the present disclosure has excellent particulate dispersibility with respect to a curable resin such as epoxy resin, and could be dispersed in a curable resin composition by a particulate phase dispersion method, and accordingly, the productivity of the curable resin composition is excellent, and mechanical properties such as impact resistance could be improved by the graft copolymer dispersed in the curable resin composition.

The invention claimed is:

1. A curable resin composition comprising a continuous phase and a dispersion phase,
   wherein the continuous phase comprises a curable resin, and
   the dispersion phase comprises a graft copolymer of a core-shell,
   wherein the graft copolymer comprises:
   a core comprising a rubbery polymer; and
   a shell formed by graft polymerizing a graft monomer to the rubbery polymer,
   wherein the graft copolymer comprises the core in an amount of 72 wt % to 83 wt % relative to a total weight of the graft copolymer,
   wherein the core has an average particle diameter of 250 nm or more, and
   wherein the shell has a weight average molecular weight of 40,000 g/mol or less.

2. The curable resin composition according to claim 1, wherein the rubbery polymer comprises one or more monomer units of a conjugated diene-based monomer unit or an alkyl acrylate-based monomer unit.

3. The curable resin composition according to claim 1, wherein the rubbery polymer is one or more selected from the group consisting of a homopolymer of a conjugated diene-based monomer, a copolymer of an aromatic vinyl-based monomer-conjugated diene-based monomer, and an acryl-based rubbery polymer.

4. The curable resin composition according to claim 1, wherein the graft monomer is one or more selected from the group consisting of an alkyl (meth)acrylate-based monomer and an aromatic vinyl-based monomer.

5. The curable resin composition according to claim 1, wherein the graft monomer comprises a methyl (meth) acrylate monomer, an alkyl (meth)acrylate-based monomer of 2 to 12 carbon atoms, an aromatic vinyl-based monomer and a crosslinkable monomer.

6. The curable resin composition according to claim 5, wherein the crosslinkable monomer is polyethylene glycol diacrylate or allyl methacrylate.

7. The curable resin composition according to claim 1, wherein the graft copolymer comprises the core in an amount of 75 wt % to 80 wt % relative to the total weight of the graft copolymer and the shell in an amount of 20 wt % to 25 wt % relative to the total weight of the graft copolymer.

8. The curable resin composition according to claim 1, wherein the core has an average particle diameter of 250 nm to 350 nm.

9. The curable resin composition according to claim 1, wherein the shell has a weight average molecular weight of 30,000 g/mol to 40,000 g/mol.

10. The curable resin composition according to claim 1, wherein the graft copolymer has an average particle diameter of 250 nm to 500 nm.

11. The curable resin composition according to claim 1, wherein the curable resin composition comprises the continuous phase in an amount of 50 wt % to 99 wt % relative to a total weight of the composition and the dispersion phase in an amount of 1 wt % to 50 wt % relative to the total weight of the composition.

12. The curable resin composition according to claim 1, wherein the curable resin is an epoxy resin.

13. A method of preparing the curable resin composition of claim 1, the method comprising:

preparing a graft copolymer latex comprising the graft copolymer (S10);

agglomerating and drying the graft copolymer latex to prepare a graft copolymer powder (S20); and mixing the curable resin and the graft copolymer powder to prepare the curable resin composition (S30), wherein the mixing is performed by dispersing using a stirrer.

14. The method of preparing the curable resin composition according to claim 13, wherein a viscosity of the curable resin composition prepared in step (S30) is 2,500 Pa·s or less at 25° C.

* * * * *